United States Patent [19]

Baum et al.

[11] 3,985,225

[45] Oct. 12, 1976

[54] CHAIN CONVEYOR WITH SUPPORT CHAIN

[76] Inventors: Sergei Alexeevich Baum, 1 Voikovsky proezd, 16, kv. 84; Nikolai Mikhailovich Meshkov, Shturvalnaya ulitsa, 14, kv. 12; Mikhail Georgievich Nikolaev, Khlebny pereulok, 14, kv. 16; Evgeny Yakovlevich Osipov, Zelenaya ulitsa, 21, kv. 1; Boris Alexandrovich Khaikin, 11 Parkovaya ulitsa, 10, kv. 45, all of Moscow; Gershon Davidovich Dymov, ulitsa Respublikanskaya, 59, kv. 26, Kuibyshev, all of U.S.S.R.

[22] Filed: Mar. 5, 1975

[21] Appl. No.: 555,615

[52] U.S. Cl. .............................. 198/834; 74/221; 214/21; 198/842
[51] Int. Cl.² ..................................... B65G 23/00
[58] Field of Search ........... 198/203, 137, 129, 204; 214/21; 74/221; 308/3 A, 6 C

[56] References Cited
UNITED STATES PATENTS

| 2,868,356 | 1/1959 | Haaff | 198/203 |
| 3,351,179 | 11/1967 | Thomson | 198/203 |

Primary Examiner—Evon C. Blunk
Assistant Examiner—Douglas D. Watts
Attorney, Agent, or Firm—Haseltine, Lake & Waters

[57] ABSTRACT

Chain conveyor with support chain comprising a frame mounting a drive sprocket and a tension sprocket, as well as an endless traction chain running therearound having a working run carrying a load that is transported, which run is supported by guides fixed to the frame through rollers having their rotational axes extending parallel with the axes of the sprockets, the rollers being pivotally interconnected in series with their ends to form an endless chain freely passing through openings in the frame, the portions of the guides surrounded by this chain having rounded portions.

2 Claims, 3 Drawing Figures

CHAIN CONVEYOR WITH SUPPORT CHAIN

The present invention relates to conveyors, and more particularly, to a chain conveyor with support chain.

The present invention may be most advantageously used in transporting heavy loads, for example aluminum alloy slabs in conveyor heating furnaces prior to the rolling of the hot slabs or for transporting reels for annealing.

Widely known in the art are chain conveyors having a frame mounting a driving sprocket and a tension sprocket, as well as an endless traction chain. The working run of this chain carrying the load being transported is supported by guides which are fastened to the frame between the sprockets. The guides in such conveyors comprise channel bars or rails.

The main disadvantage of such known conveyors when used in conveyor furnaces consists in their restricted capabilities (with the maximum total weight of the load not exceeding 20–30 tons), which is due to a high coefficient of friction between the links of the traction chain and the guides, especially at high temperatures.

This results in a considerable oversizing of the drive of the driving sprocket and in a greater size and weight of the traction chain and a relatively rapid wear thereof.

According to major features of the present invention, there is provided a chain conveyor with support chain having a frame mounting a driving sprocket and a tension sprocket, as well as an endless traction chain running therearound, the working run of the chain carrying a load, supported by guides fastened between the sprockets. The working run of the traction chain is supported by the guides by means of rollers having their rotational axes extending in parallel with the sprocket axes, the rollers being pivotally interconnected in series with their ends in such a manner as to form an endless chain freely passing through openings in the frame, and the portions of the guides surrounded by this chain have rounded portions.

Such construction permits to substitute the friction of the chain rolling on the rollers, and of the rollers on the guides, instead of the sliding friction of the traction chain along the guides, whereby the coefficient of friction between the traction chain and the guide is considerably reduced.

This, in turn, permits to reduce by several times the traction force of the drive with the same size of chain conveyor, and with the same traction force to increase the total weight of the load transported at the same time.

Besides, a lower coefficient of friction between the traction chain and the guides permits to reduce the weight of the chain and to prolong the service life of the conveyor as a whole in the high-temperature environment of a furnace.

Additional rollers are preferably provided at the portions of the guides adjacent to the sprockets so as to prevent the working run of the traction chain from sagging.

Each roller preferably has an annular projection in the intermediate portion thereof, disposed between the links of the traction chain.

This construction permits to make the operation of the traction chain smoother since the annular projections of the rollers constitute longitudinal guides that limit lateral displacements of the traction chain.

The invention will now be described in detail with reference to the accompanying drawings, in which:

FIG. 1 schematically shows a longitudinal section of an exemplary chain conveyor according to the invention;

Figure 1:
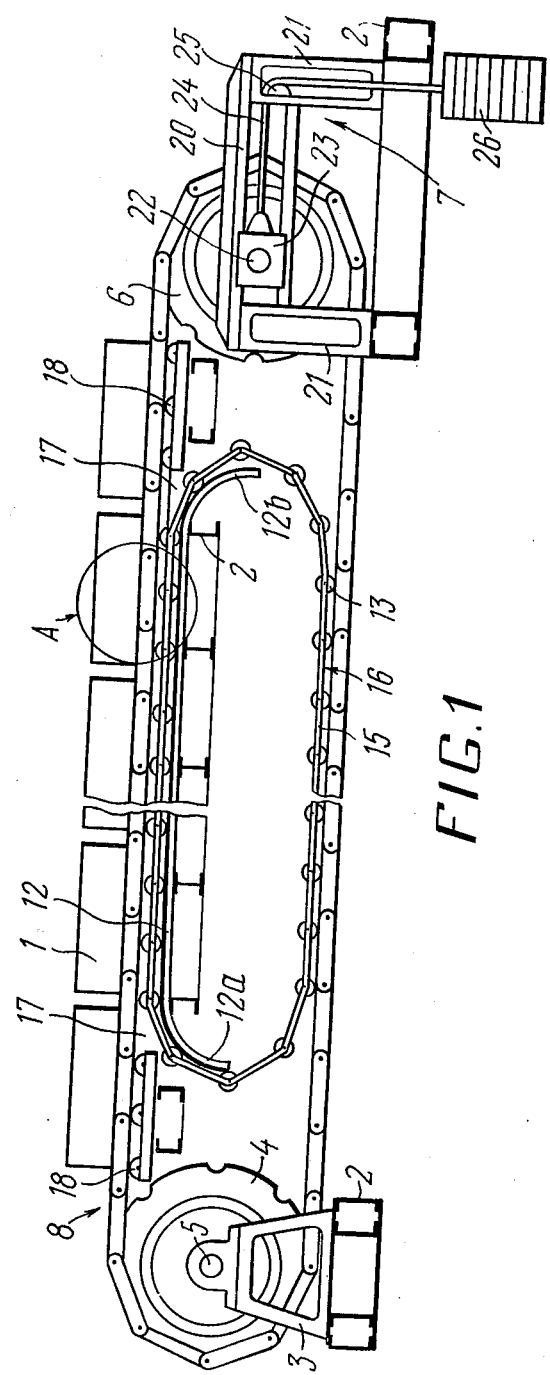

The chain conveyor according to the invention is intended for transporting heavy loads such as slabs 1, such as aluminum alloy slabs, through the working space of an electric heating furnace (not shown) and for delivering them one-by-one to a rolling mill (not shown) for subsequent hot rolling.

The chain conveyor comprises a frame 2 extending through the furnace space, and a driving sprocket 4 is mounted at one end thereof, outside the furnace on two columns 3, the sprocket 4 being mounted on an axle 5 coupled to an output shaft of an electric motor (not shown), and the other end of the frame 2 supports a tension sprocket 6 having a tensioning device 7.

Figure 2:
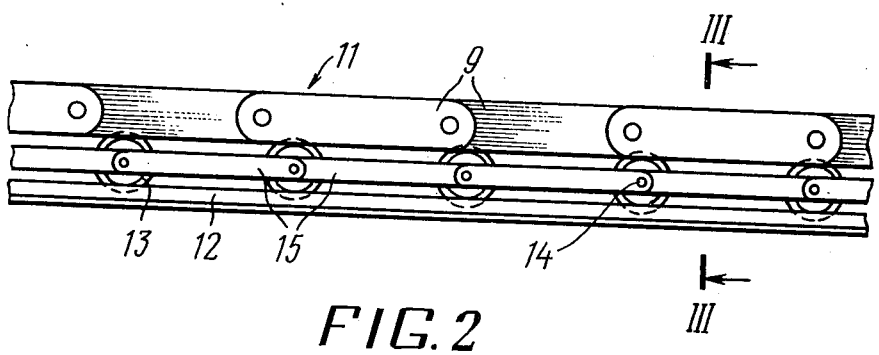
FIG. 2 is an enlarged detail A in FIG. 1.
Figure 3:
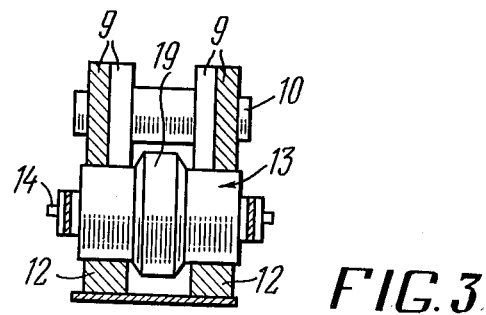
FIG. 3 is an enlarged sectional view taken along the line III—III in FIG. 2.

An endless traction chain 8 composed of two parallel rows of links 9 (FIG. 2) articulated to each other on pivots 10 (FIG. 3), is supported on the teeth of the sprockets 4 and 6.

A working run 11 of the chain 8 carrying the load to be transported, that is the slabs 1, is supported, according to the invention, by guides 11 fixed to the frame 2 through rollers 13 having their rotational axes 14 extending parallel with the axles of the sprockets 4 and 6 and pivotally interconnected in series with their ends by means of links 15 so as to form an endless chain 16 (FIG. 1).

According to the invention, the frame 2 has two openings 17, and the side portions of the endless chain 16 freely pass through these openings. The end portions 12a and 12b of the guides 12 surrounded by the chain 16 are rounded.

In order to prevent the working run 11 of the traction chain 8 from sagging, additional rollers 18 can be provided at the portions of the guides located between the sprockets 4 and 6 and the openings 17.

Each roller 13 and 18 may have an annular projection 19 at the intermediate portion thereof (FIG. 3) located between the links 9 of the traction chain 8. The projections 19 of the rollers 13 and 18 serve as longitudinal guides for preventing the traction chain 8 from lateral displacement.

The tensioning device 7 (FIG. 1) has a conventional construction and comprises a longitudinal guide 20 mounted on the frame 2 of the conveyor on two supports 21 disposed on either side of an axle 22 on which there is mounted the tension sprocket 6.

A slide block 23 with a hole for the free passage of the axle 22 of the tension sprocket 6 is movable in the guide 20.

A rope 24 is fixed to the slide block at the external side, the other end of the rope passing around a pulley 25 mounted on the guide 20, and a tensioning weight 26 is fixed to this end of the rope. The tensioning of the traction chain 8 is adjusted by changing the weight 26 that moves the axle 22 of the tension sprocket 6 together with the slide block 23 along the guide 20.

In the manner described above, several conveyors may be mounted on the same frame in parallel with each other depending on the transverse dimension of the load being transported.

The above-described chain conveyor functions as follows: Upon energization of the electric motor, the rotary motion from its output shaft is transmitted to the axle 5 of the driving sprocket 4 and further, through the teeth thereof, to the traction chain 8 which is caused to move and rotates the tension sprocket 6 by cooperating with its teeth.

During the movement of the traction chain 8 the slabs 1 to be transported are placed one-by-one on the working run 11 thereof at one end of the furnace. The links 9 of the working run 11 cooperate with their lower surface with the rollers 13 of the endless chain 16 causing them to run along the guides 12.

Therefore, the slabs 1 are transported into the working space of the heating furnace, wherein they are heated at a required temperature. This process can be accomplished either continuously or with interruptions in the conveyor movement.

After the heating, the slabs 1 are delivered in succession from the furnace to a rolling mill.

The use in the chain conveyor according to the invention of an endless chain 16 with rollers 13 makes it possible to replace the sliding friction of the working run 16 of the traction chain 8 along the guides 12 by the rolling friction, whereby the coefficient of friction therebetween is decreased 5–6 times so that the value of the traction force required may be reduced, or the total weight of the load being transported may be increased, respectively.

Thus, in known chain conveyors used for heating furnaces the present invention permits to increase the total transported weight from 20–30 up to 100 tons and higher.

Furthermore, the conditions of operation of the traction chain are improved, thereby prolonging the service life of the chain and the chain conveyor as a whole.

The use of the chain conveyor according to the invention in known heating furnaces permits to increase their productivity 5–6 times at the same production area.

What is claimed is:

1. A chain conveyor for transporting a load, comprising: a frame having openings; a driving sprocket mounted at one end of said frame; means mounted on said frame for rotating said sprocket; a tension sprocket mounted at the opposite of said frame with respect to said driving sprocket; guides fixed to said frame between said sprockets; rollers having their rotational axes extending parallel with those of said sprockets, said rollers being pivotally interconnected, with their ends in series, so as to form an endless chain freely passing through said openings; and an endless traction chain passing around said sprockets, including links thereon, and its working run carrying the load supported by said guides through said rollers; portions of said guides surrounded by said chain being formed by said rollers, which have rounded portions; wherein each of said rollers is provided at an intermediate portion thereof with an annular projection located between said links of the traction chain.

2. The conveyor as defined in claim 1, further comprising additional rollers provided at said guide portions, adjacent said sprockets, to prevent said working run of the traction chain from sagging.

* * * * *